（12）United States Patent
Dougherty et al.

(10) Patent No.: US 6,174,933 B1
(45) Date of Patent: Jan. 16, 2001

(54) RADIATION POLYMERIZABLE VINYLETHER-BASED COMPOSITIONS

(75) Inventors: James A. Dougherty, Kinnelon; John McKittrick, Jersey City; Arvind M. Mathur, Wayne, all of NJ (US)

(73) Assignee: ISP Investments Inc., Wilmington, DE (US)

(*) Notice: Under 35 U.S.C. 154(b), the term of this patent shall be extended for 0 days.

(21) Appl. No.: 09/288,468

(22) Filed: Apr. 8, 1999

(51) Int. Cl.[7] .................... C09J 123/02; C09J 123/20; C09J 125/02; C08F 2/50; C08L 25/02

(52) U.S. Cl. .................... 522/110; 522/31; 522/120; 522/121; 525/385; 525/416; 524/525; 524/526; 524/528; 524/534; 524/570; 524/571

(58) Field of Search ................ 522/31, 181, 120, 522/121, 110; 525/385, 416; 524/525, 526, 528, 534, 570, 571

(56) References Cited

U.S. PATENT DOCUMENTS

| | | | |
|---|---|---|---|
| 3,280,217 | * | 10/1966 | Lader et al. . |
| 4,291,114 | * | 9/1981 | Berggren et al. . |
| 5,314,929 | * | 5/1994 | Crivello et al. . |
| 6,028,124 | * | 2/2000 | Glover et al. . |

FOREIGN PATENT DOCUMENTS 0 477 115 A1 * 9/1991 (EP) .

* cited by examiner

Primary Examiner—Susan W. Berman
(74) Attorney, Agent, or Firm—Walter Katz; William J. Davis; Marilyn J. Maue

(57) ABSTRACT

Radiation polymerizable vinylether-based compositions, and cured vinylether-based formulations having a predetermined balance of tack, peel and shear particularly suitable for use in pressure sensitive adhesives are described.

9 Claims, 2 Drawing Sheets

Effect of amount of tackifier of the adhesive properties of a formulation containing 99% EHVE/1% CHVE and 2 phr UV9380C cationic photoinitiator.

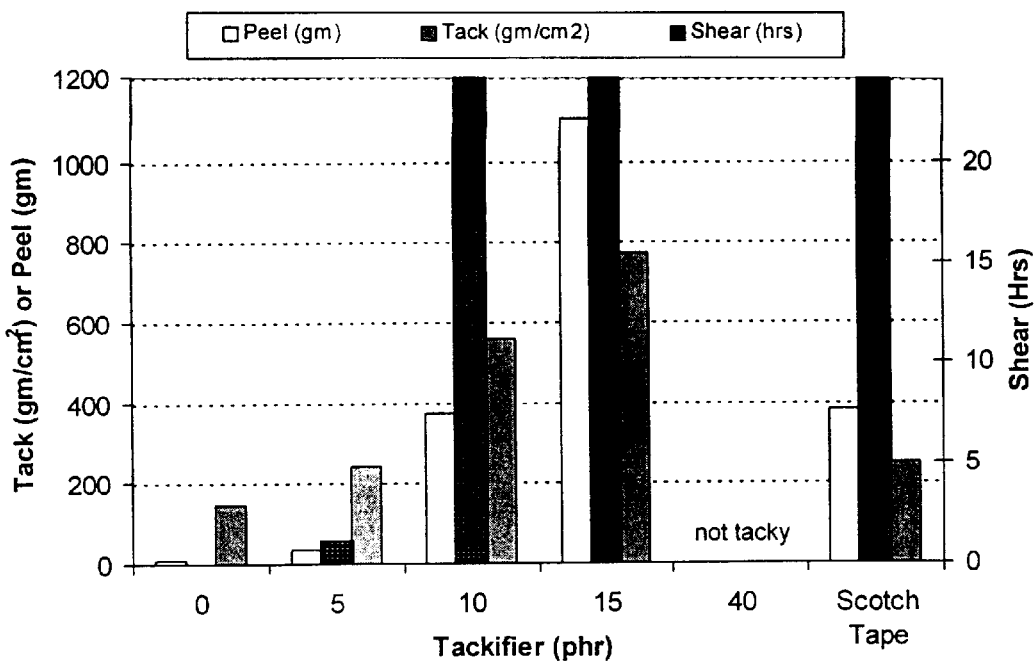
FIGURE 1. Effect of amount of tackifier of the adhesive properties of a formulation containing 99% EHVE/1% CHVE and 2 phr UV9380C cationic photoinitiator.
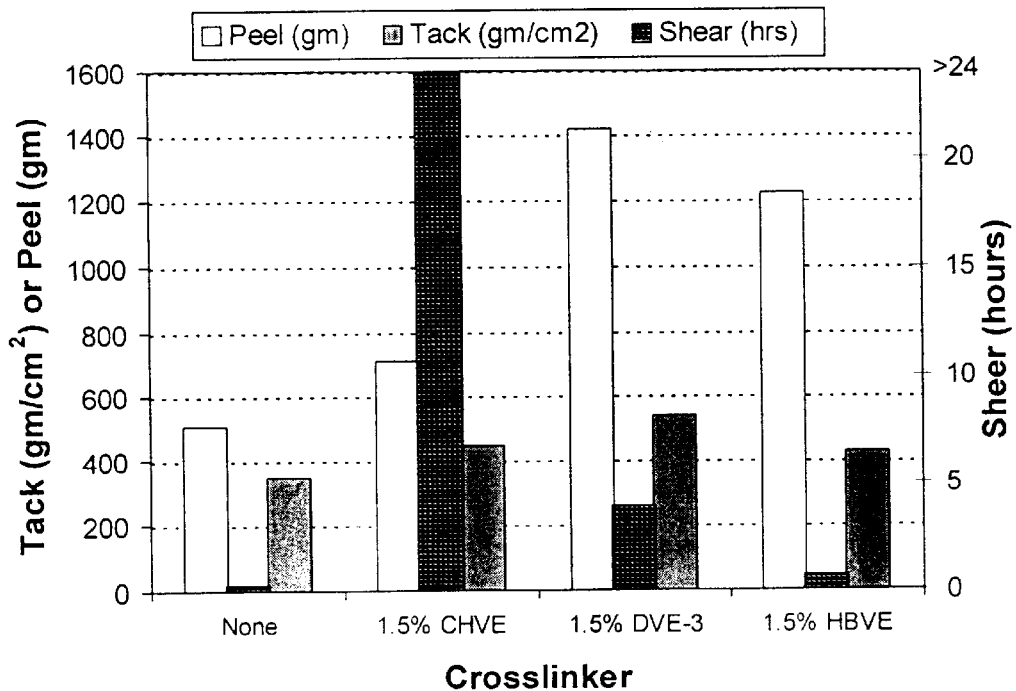
FIGURE 2. Effect of various comonomers as crosslinkers in a 98.5% EHVE/1.5% Crosslinker/15 phr Tackifier formulation containing 2 phr UV9380C photoinitiator.

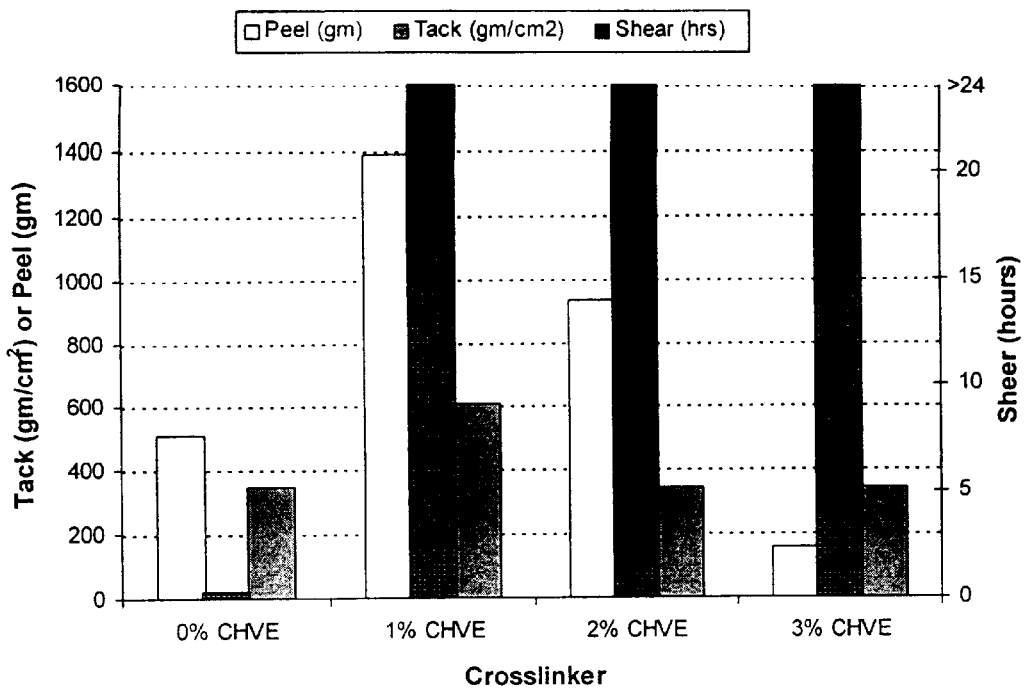
FIGURE 3. Effect of amount of crosslinker (CHVE) on a formulation containing EHVE, 15 phr tackifier and 2 phr UV9380C cationic photoinitiator.
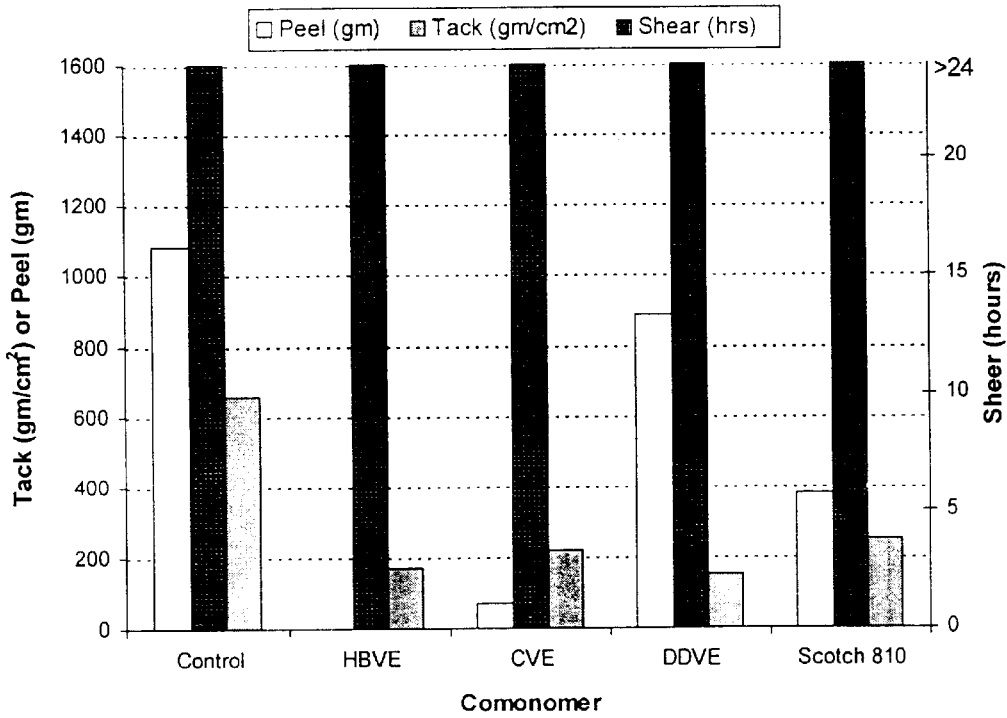
FIGURE 4. Effect of inclusion of 25wt% comonomer on the adhesive properties of a (74wt%) EHVE/(1wt%)CHVE/(15phr)Tackifier PSA formulation.

RADIATION POLYMERIZABLE VINYLETHER-BASED COMPOSITIONS

BACKGROUND OF THE INVENTION

1. Field of the Invention

This invention relates to radiation polymerizable vinylether based compositions, and, more particularly, to cured vinyl ether compositions having a predetermined balance of tack, peel and shear suitable for use in pressure sensitive adhesive applications.

2. Description of the Prior Art

Aeling, E.O. et al, in EPA 0447115A1, published Sep. 18, 1991, described radiation curable coating compositions which required the presence of both a monovinylether monomer whose homopolymer had a Tg of 300° K or lower (low Tg) and a monovinyl ether monomer whose homopolymer had a Tg of 300° K or higher (high Tg).

Accordingly, it is an object of this invention to provide a radiation polymerizable vinylether composition of a single monovinylether having a predetermined balance of tack, peel and shear suitable for use in pressure sensitive adhesive applications.

These and other objects of the invention will be made apparent from the following description thereof.

TABLE I

Vinylether Monomers

DVE-3-(triethyleneglycol divinylether)
CHVE-(cyclohexanedimethanol divinylether)
CVE-(cyclohexylvinylether)
EHVE-(ethylhexylvinylether)
DDVE-(dodecylvinylether)
HBVE-(hydroxybutyl vinylether)

SUMMARY OF THE INVENTION

What is described herein is a radiation polymerizable composition, which has, by weight:

(a) at least 95% of a liquid $C_5$–$C_8$ linear or branched alkyl monovinyl ether monomer,
(b) up to 5% of a divinyl or trivinyl ether crosslinker,
(c) up to 5% of a cationic photoinitiator, and
(d) about 10 to 30 parts per hundred resin (phr) of a hydrocarbon soluble tackifier resin.

The composition herein also may include (e) up to 10 phr of a non-reactive filler.

In preferred chemical embodiments of the invention, (a) is ethylhexylvinyl ether, (b) is cyclohexanedimethanoldivinyl ether or triethyleneglycoldivinyl ether, (c) is an iodonium/sulfonium salt and (d) is a hydrogenated hydrocarbon resin. In preferred compositional ranges of the composition, (a) is 96–99%, (b) is 1–3%, (c) is 1–3 phr, (d) is 10–15 phr, and (e) is 5–10 phr.

The polymerizable composition of the invention has a predetermined viscosity of about 50 to 500 cps which is suitable for spray, gravure or roll coating the composition onto a substrate. The resultant cured coating has a predetermined balance of tack, peel and shear properties, preferably a tack of about 200–1000 g/cm$^2$, a peel of about 200–1500 g, and a shear of at least 24 hrs.

IN THE DRAWINGS

FIG. 1 is a plot of peel, tack and shear vs. tackifier concentration (phr) for a representative composition of the invention.

FIG. 2 is a graphical representation of peel, tack and shear for a representative formulation of the invention and for comparative formulations.

FIG. 3 is a graphical representation of peel, tack, and shear versus crosslinker level for a representative composition of the invention.

FIG. 4 is a plot of peel, tack, and shear versus comonomer type for compositions of the invention and a commercial tape.

DETAILED DESCRIPTION OF THE INVENTION

What is described herein is a radiation polymerizable composition, which has, by weight:

(a) at least 95% of a liquid $C_5$–$C_8$ linear or branched alkyl monovinyl ether monomer,
(b) up to 5% of a divinyl or trivinyl ether crosslinker,
(c) up to 5% of a cationic photoinitiator, and
(d) about 10 to 30 phr of a hydrocarbon soluble tackifier resin.

The composition herein also may include (e) up to 10 phr of a nonreactive filler.

In preferred chemical embodiments of the invention, (a) is ethylhexylvinyl ether, (b) is cyclohexanedimethanoldivinyl ether or triethyleneglycoldivinyl ether, (c) is an iodonium/sulfonium salt and (d) is a hydrogenated hydrocarbon resin. In preferred compositional ranges of the composition, (a) is 96–99%, (b) is 1–3%, (c) is 1–3 phr, (d) is 10–15 phr, and (e) is 5–10 phr.

The polymerizable composition of the invention has a predetermined viscosity of about 50 to 500 cps which is suitable for spray, gravure or roll coating the composition onto a substrate. The resultant coating has a predetermined balance of tack, peel and shear properties, preferably a tack of about 200–1000 g/cm$^2$, a peel of about 200–1500 g, and a shear of at least 24 hrs.

In this invention, a cured coating is provided having a predetermined balance of tack, peel and shear properties from a monovinylether composition containing a suitable amount of a tackifying resin. Preferred results were achieved using a hydrocarbon soluble resin such as Regalrez® 1085 (Hercules). For example, a formulation of EHVE, a low Tg monomer, crosslinked with 1 wt. % CHVE, in the absence of a tackifier, cured rapidly to form a tacky mass with essentially no peel or shear strength, whereas, a formulation containing 10 to 15 phr (parts per hundred resin) of a tackifier, e.g. Regalrez® 1085, provide both peel and shear strength of a desired magnitude. Very high levels of the same resin e.g. 40 phr, however degrades performance, and is not suitable for use herein. At 10–15 phr tackifier levels, a preferred range, performance of the coating of the invention is equal to or superior to that of a commercial tape (see FIG. 1).

The following procedures and test methods were adopted in this study. PSA formulations were prepared by mixing the components in an amber vial at room temperature. Each formulation was applied to a 2 mil polyester film by hand drawdown using a #12 Mayer bar. Samples were cured by exposure to UV irradiation of 1000 mJ/cm2 using either an AETEK Model QC 1202A/N UV Processor or a Fusion System Irradiator containing an "H" bulb. Unless otherwise noted, samples were post cured at 700° C. for a minimum of 15 minutes.

Tack was measured in grams using a Testing Machines Incorporated Probe Tack tester with a dwell time of 0.2 seconds and a speed of 0.1 cm/sec. A minimum of 5 trials was conducted on each sample and the mean reported in grams/cm$^2$.

Peel strength was obtained using a Gardner Slip/Peel Tester. Adhesives were cast on polyethylene terephthalate films and cured as described above. One inch wide strips were cut, applied to a steel substrate, and rolled with a 5 pound rubber roller 5 times. The force required to remove the tape at an angle of 180 degrees was measured in grams. A minimum of 5 trials was conducted on each sample and the mean reported.

Shear strength was determined by contacting a one inch square at one end of a cured PSA coated polyester strip to a stainless steel test panel leaving the other end of the strip free. The test panel was then rolled with a 5 pound rubber roller 5 times and attached to a rack in the vertical position. A 500 gram weight was attached to the free end of the coated strip and the elapsed time for each strip to separate from the test panel was recorded. Unless otherwise noted, the experiment was terminated after 24 hours.

The effect of using different crosslinkers in the composition of the invention was compared at a constant tackifier level of 15 phr. These formulations exhibited good tack. In the absence of any crosslinker, however, the formulations had essentially no shear strength. CHVE-containing compositions had the highest shear while DVE-3 crosslinked provided the highest peel. These results are shown in FIG. 2.

At a constant tackifier level of 15 phr, an increase in the amount of crosslinker decreases tack and peel while shear strength remains greater than 24 hours (FIG. 3).

The performance of several monovinylethers was compared in the following prototype formulation:

(a) 74 wt % EHVE/25 wt % comonomer (b) 1 wt % CHVE (c) 2 phr UV 9380C (d) 15 phr Regalrez® 1085

The control formulation containing 99% EHVE provided the best combination of properties. DDVE may be preferred in formulations where low tack is desired (FIG. 4).

The formulations of the invention are very low in viscosity due to their high monomer content. For example, a formulation based on 99 wt % EHVE crosslinked with 1 wt % CHVE, and including 15 phr Regalrez® 1085 has a viscosity of only 22 cps. However, when desired, the viscosity of the formulation can be readily increased by incorporating low levels of suitable nonreactive fillers. Poly (isobutylene) is a particularly effective viscosity enhancing filler for use herein, as demonstrated in Table II below.

TABLE II

|  | (A) | (B) | (C) |
|---|---|---|---|
| FORMULATION COMPOSITION | | | |
| EHVE | 99 | 99 | 99 |
| CHVE | 1 | 1 | 1 |
| UV9380C | 2 | 2 | 2 |
| Regalrez ®1085 | 15 | 15 | 15 |
| Poly(isobutylene) | 0 | 2.5 | 7.5 |
| FORMULATION PROPERTIES | | | |
| Viscosity (cps) | 22 | 64 | 475 |
| Peel (gm/lin) | 1391 | 1300 | 900 |
| Tack (gm/cm$^2$) | 606 | 651 | 676 |
| Shear (hrs) | >168 | >168 | >168 |

The vinylether based UV curable coating formulations of the invention can also be used as laminating adhesives. Such formulations can be cured by either cationic, free radical, charge-transfer or hybrid. In each case, the vinylether component of the formulation contributes to a low viscosity, high cure speed and low toxicity composition.

While the invention has been described with particular reference to certain embodiments thereof, it will be understood that changes and modifications may be made which are within the skill of the art. Accordingly, it is intended to be bound only by the following claims, in which:

What is claimed is:

1. A radiation polymerizable composition, consisting essentially of, by weight:

(a) at least 95% of a low Tg liquid $C_5$–$C_8$ linear or branched alkyl monovinyl ether monomer, (b) up to 5% of a divinyl or trivinyl ether crosslinker, (c) up to 5% of a cationic photoinitiator, and (d) about 10 to 30 parts by hundred (phr) of a tackifier resin soluble in (a), said composition being curable to provide a cured coating having a tack of about 200–1000 g/cm$^2$, a peel of about 200–1500 g, and a shear of at least 24 hrs.

2. A composition according to claim 1 which also includes (e) up to about 10 phr of a non-reactive filler.

3. The polymerizable composition of claim 2 having a predetermined viscosity of about 50 to 500 cps suitable for spray, gravure or roll coating.

4. The polymerizable composition of claim 3 having a tack of about 200–1000 g/cm$^2$, a peel of about 200–1500 g, and a shear of at least 24 hrs.

5. A composition according to claim 1 wherein (a) is ethylhexylvinyl ether.

6. A composition according to claim 1 wherein (b) is cyclohexane-dimethanoldivinyl ether or triethyleneglycoldivinyl ether.

7. A composition according to claim 1 wherein (d) is a hydrogenated hydrocarbon resin.

8. A composition according to claim 2 wherein (a) is 96–99%, (b) is 1–3%, (c) is 1–3 phr, (d) is 10–15 phr and (e) is 5–10 phr.

9. The polymerizable composition of claim 1.

* * * * *